United States Patent [19]

Broussaud

[11] 4,017,893

[45] Apr. 12, 1977

[54] DISPLAY DEVICE FOR PRODUCING POLYCHROMATIC LUMINOUS IMAGES

[75] Inventor: Georges Broussaud, Paris, France

[73] Assignee: Thomson-CSF, Paris, France

[22] Filed: Sept. 9, 1975

[21] Appl. No.: 611,837

[30] Foreign Application Priority Data

Sept. 13, 1974 France .......................... 74.31150

[52] U.S. Cl. .............................. 358/59; 358/242

[51] Int. Cl.² ...................... H04N 9/12; H04N 5/70

[58] Field of Search ................ 358/59; 178/7.3 D; 340/324 M, 173 PL; 315/169 TV; 313/485

[56] References Cited

UNITED STATES PATENTS

| | | | |
|---|---|---|---|
| 3,564,136 | 2/1971 | Gilmour, Jr. et al. | 178/7.3 D |
| 3,748,378 | 7/1973 | Garrison et al. | 358/59 X |
| 3,800,186 | 3/1974 | Yamane et al. | 178/7.3 D X |
| 3,800,296 | 3/1974 | Weber | 178/7.3 D X |
| 3,899,636 | 8/1975 | Chodil et al. | 178/7.3 D |

*Primary Examiner*—Robert L. Griffin
*Assistant Examiner*—Mitchell Saffian
*Attorney, Agent, or Firm*—Cushman, Darby & Cushman

[57] ABSTRACT

A display device for producing polychromatic luminous images comprising a display panel containing gas cells, electrodes for ionization of the gas, and a photoconductive layer located between the electrodes and responsive to a scanning invisible radiating beam. Each cell further comprises luminophore emitting primary visible radiations at the time of ionization of the gas, the ionization being effected by rendering the photoconductive layer locally conductive.

8 Claims, 3 Drawing Figures

DISPLAY DEVICE FOR PRODUCING POLYCHROMATIC LUMINOUS IMAGES

The present invention relates to polychromatic image displays, the images being furnished in the form of electrical signals, and more particularly to large-screen displays, that is to say displays on a screen of the order of some square meters.

Various devices for large-screen colour display applications, have already been proposed. Among these, one can point in particular to the "Eidophore" the performance characteristics of which, namely resolution and luminosity, are satisfactory but whose complexity, and consequently cost, are too great. Also, large-screen projection of the image formed upon the (small-sized) screen of a cathode-ray tube, has been carried out, but the results were mediocre and have prevented the commercial introduction of such a device. Finally, other techniques have been tried which utilise electro-optical modulation of light but they are generally either inadequate in terms of performance or too expensive. One result which the present invention seeks to achieve is a screen for the polychromatic display of electrical information, in particular television signals, which is large in size, and flat, and yields a display quality at least equal to that of conventional small television screens, and is sufficiently inexpensive to make it a commercial proposition.

According to the invention, there is provided a display device for producing polychromatic luminous image, externally controlled by both electrical signals and invisible scanning radiating beam comprising:

a display panel, comprising two main faces opposed to each other, forming a gas-tight enclosure in which a ionizable gas is disposed, at least one of said faces being transparent to said radiating beam which have a wave length lower than the wave length of visible radiations;

electrical means comprising a first group of electrodes and a second group of electrodes respectively located on said two main faces, which when facing each other determine elementary zones of ionization in said gas-tight enclosure, said two groups of electrodes being adapted for receiving a supplying voltage; photoconductive elements placed in said elementary zones between said two groups of electrodes, responsive to said invisible scanning radiating beam, which scans said transparent main face for enabling local ionizaton of said zones;

and several groups of luminescent elements arranged in said elementary zones, responsive to the charges produced by said ionization and adapted for respectively emitting primary radiations forming by addition the synthesis of said image, said electrical signals modulating said primary radiations.

Figure 1:
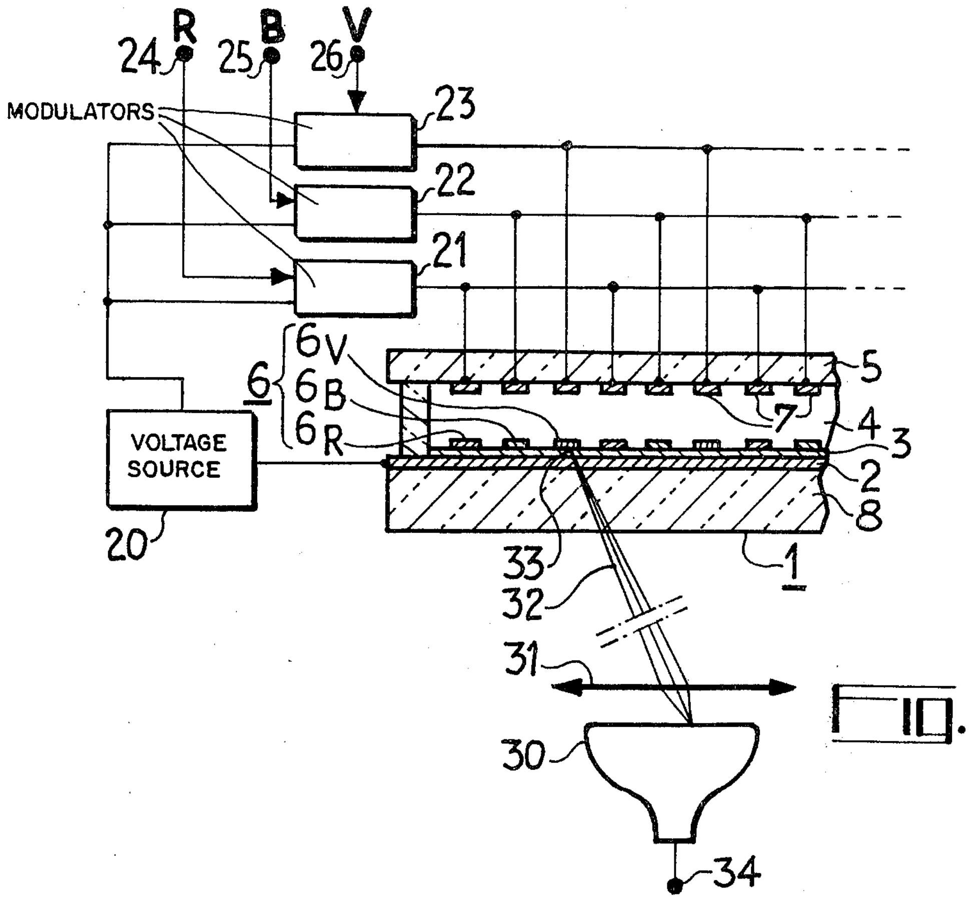
Figure 2:
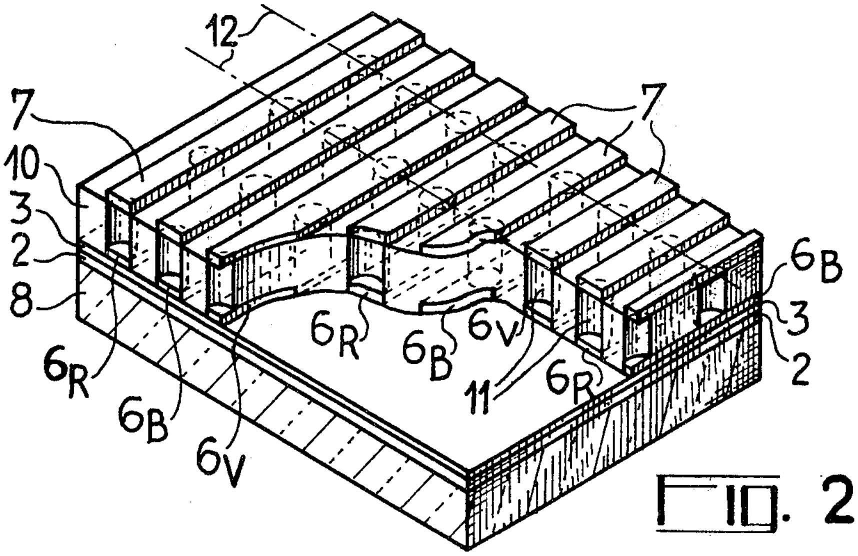
Figure 3:
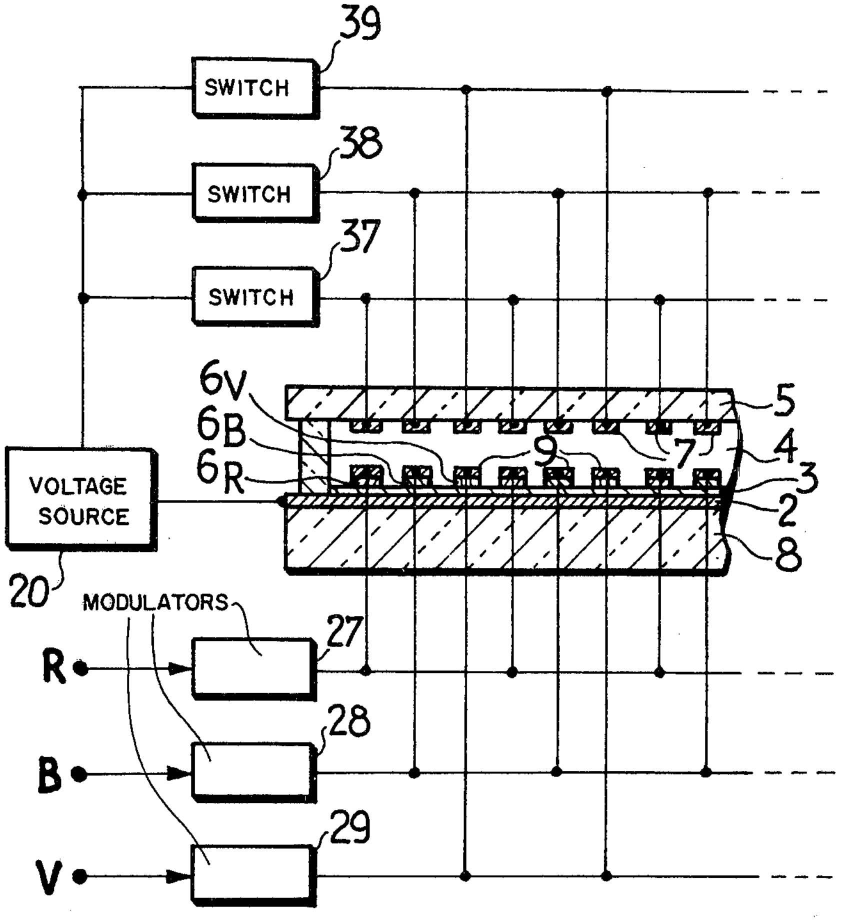

The invention will be better understood from a consideration of the ensuing description and the attached drawings in which:

FIG. 1 schematically illustrates an embodiment of the display device in accordance with the invention;

FIG. 2 is a partial, perspective view of the diagram shown in FIG. 1;

FIG. 3 schematically illustrates a variant embodiment of the device in accordance with the invention.

In FIG. 1, a display panel 1 has been shown together with an electronic biasing and modulating system (references 20 to 26), and finally, addressing means (references 30 to 34).

The panel 1 comprises a first transparent substrate 8, made of glass for example, constituting the front face of the panel and on which there have successively been deposited;

a transparent electrode 2 made for example of a tin oxide layer whose thickness is of the order of 1 micron;

a photoconductive layer 3, the resistance of which being divided by around 3 when illuminated by invisible radiation, for example in the ultra-violet when the photoconductive layer 3 is made of zinc oxide some few microns in thickness;

a succession of luminescent oxide bands 6, known as luminophores or phosphoruses of the kind utilised in the manufacture of polychromatic cathoscopes, these, under electron bombardment, emitting visible radiation whose wavelength depends upon the nature of the luminophore; by way of example, in the figure luminophores of three kinds have been shown emitting in the red (marked $6_R$), the blue ($6_B$) and the green ($6_V$), and repeating in this sequence; the width of the luminophores is determined by the choice of the dimensions of the screen and by the resolution of said screen.

The panel 1 comprises a second substrate 5 which can also be made of glass, attached to the first, 8, in order to form a gas-tight enclosure 4 some few millimeters in thickness, filled with ionizable gas preferably readily ionizable at low pressure, for example a rare gas. On the internal face of the second substrate 5 a series of electrodes 7 in the form of parallel bands is arranged opposite the luminophore bands 6.

The biasing and modulating system referred to earlier, comprises a voltage source 20 connected on the one hand to the electrode 2 and on the other hand to the electrodes 7 through three modulators: 21, 22 and 23. These modulators furthermore have three, respectively control inputs: 24R, 25B and 26V.

The voltage source 20 continuously supplies a high voltage sufficient to ionize the gas between the electrodes 2 and 7 in the absence of the photoconductive layer 3.

The addressing means are constituted by a radiant energy source, radiating outside the visible spectrum, for example ultra-violet radiation (UV), capable of being focussed on to a predetermined zone of the panel 1. The function of these addressing means is to locally drive the photoconductive layer 3 into a conductive state; this can be done with the help of a very low energy beam, in particular in the case of UV radiation directed on to a layer 3 of zinc oxide.

In the embodiment shown in FIG. 1, the source is constituted by a cathode ray tube 30 in which the luminophore emits in the ultra-violet and which is supplied at an input 34, schematically illustrated there, with the co-ordinates of that zone 33 of the photoconductive layer 3, on to which the ultra-violet beam 32 is directed and moreover concentrated by an objective lens 31.

In operation, when the three modulators 21, 22, 23 are controlled in order to integrally apply to the electrodes 7 the potential furnished by the source 20, and in the absence of illumination of the photoconductor 3 by the UV beam 32, the resistance of the photoconductor 3 is such that ionization of the gas contained in the space 4 is not possible so that the luminophores 6 cannot be excited. If, by means of the UV beam 32, the resistance of the photoconductor 3 is locally reduced, a discharge takes place between the electrodes 7 and 2 opposite the zone 33, thus liberating electrons which excite the luminophore or luminophores 6 located opposite said same zone.

It should be pointed out that the zone of concentration 33 of the UV beam, has been illustrated as virtually a point in the figure; it could equally well, of course, extend over several luminophores 6, preferably 3 in order to compose a colour as a function of the control signals applied to the modulators 21, 22, 23. In other words, these latter have the function of modulating the voltage applied to the electrodes 7, in accordance with a signal received at their control inputs 24R, 25B and 26R, in order to modulate the intensity of the discharge and consequently the intensity of the colour displayed. To this end, each of electrodes 7 is connected to one of the three modulators as the figure shows in such a fashion that the modulator 21 controls the colour red, through the electrodes 7 located opposite the luminophores $6_R$, the modulator 22 the colour blue and the modulator 23 the colour green in the same way.

FIG. 2 illustrates a perspective view of part of FIG. 1, showing the first transparent substrate 8, the transparent electrode 2, the photoconductor 3, the luminophore bands 6 and the electrode bands 7, the latter bands being separated from the former by a matrix 10 providing good operation of the display device, and not represented on FIG. 1.

The matrix 10 is constituted by an insulating material in which holes are formed containing the ionizable gas, the holes being aligned on the one hand on the bands 6 and 7 and on the other on axes 12 which constitute the lines of scan followed by the addressing UV beam, FIG. 1 corresponding to a section through said device along one of said axes 12 not including the matrix 10, this latter being designed to localise the discharge in the manner already well-known from the technique of plasma display panels.

FIG. 3 illustrates a variant embodiment of the invention in which there once again appear the first substrate 8, the electrodes 7 and the second substrate 5, and in which electrodes 9 have been added, deposited in the form of thin films on that face of the luminophores 6 which is deposited towards the electrodes 7, said electrodes 9 being connected through three channels to the modulators 27, 28 and 29, in the same way in which, in FIG. 1, the electrodes 7 were connected to the modulators 21, 22, 23. In FIG. 3, the electrodes 7 are connected to the voltage source 20 (in addition connected to the electrode 2), possibly through the intermediary of one switch per colour, namely the switches 37, 38 and 39 respectively for red, blue and green.

This variant embodiment constitutes an improvement in the intensity modulation of the colour emitted by a luminophore as a function of the voltage applied to the modulators:

considering that the discharge phenomena in the gases are difficult to modulate, the quantity of electrons exciting each luminophore is controlled with the electrodes 9 and the voltage supplied to these latter by the modulators 27, 28, 29 under external controls 24R, 25B and 26V.

The electrodes 9 can furthermore be utilised to remove charges which could accumulate of the luminophores and consequently disturb the operation of the display panel.

In FIG. 3, neither the matrix 10 of FIG. 2 nor the addressing means described in FIG. 1, have been shown, but the latter must be added to the device of FIG. 3 for operation and the former could be added.

Thus, a relatively simple device has been created, which is inexpensive and simple to install, the UV addressing only requiring a low energy.

The description given hereinbefore is of course intended purely by way of non-limitative example. Thus, for example, the luminophores 6 have been described as being sensitive to the impact of electrons produced by a gas discharge; the replacement of these elements 6 by luminophores sensitive to UV radiation created at the time of said same discharge, also falls within the scope of the invention. Again, the electrode 2 has been described which covers the whole of the substrate 8 and the luminophore bands 6; an electrode 2 split into a network of parallel rows (perpendicular to the parallel bands 7), and luminophores of limited extent at the intersection of the aforesaid network with the electrodes 7, also fall within the scope of the invention.

Finally, UV addressing has been described as being carried out by means of electronic scanning of a cathode ray tube; its implementation by another means, such as the mechanical deflection of a UV beam produced by a mercury-vapour lamp, or again acousto-optical or electro-optical deflection of a laser beam, also falls within the scope of the invention.

I claim:

1. A display device for producing a polychromatic luminous image, externally controlled by both electrical signals and an invisible scanning radiating beam, comprising:

a display panel comprising two main faces facing each other and forming a gas-tight enclosure for retaining an ionizable gas, at least one of said faces being transparent to said radiating beam which beam has a wave length lower than the wave length of visible radiation;

electrical means comprising a first group of electrodes and a second group of electrodes respectively located on said two main faces, which when facing each other determine elementary zones of ionization in said gas-tight enclosure, said two groups of electrodes being adapted for receiving a supply voltage;

photoconductive elements placed in said elementary zones between said two groups of electrodes, responsive to said invisible scanning radiating beam, which scans said transparent main face for enabling local ionization of said zones; and several groups of luminescent elements arranged in said elementary zones, responsive to the charges produced by said ionization and adapted for respectively emitting primary radiations and forming by addition the synthesis of said image, said electrical signals modulating said primary radiations.

2. A display device as claimed in claim 1 wherein said first group of electrodes is in the form of a transparent electrode and said second group of electrodes is formed by parallel conductive bands, said photoconductive elements being in the form of a photoconductive layer deposited on said transparent electrode, said luminescent elements being arranged in parallel luminescent bands on said photoconductive layer and facing said parallel conductive bands, and said radiating beam scanning said display panel along lines making a non zero angle with said parallel luminescent bands.

3. A display device as claimed in claim 2 wherein said electrical signals modulate said primary radiations by modulating said supplying voltage.

4. A display device as claimed in claim 2 wherein further electrodes are located on said parallel luminescent bands the potential of said further electrodes being controlled by said electrical signals for modulating the flow of said electrical charges.

5. A display device as claimed in claim 4 wherein said parallel luminescent bands are arranged by triplets in order to form a trichromatic image, said display device being controlled by three corresponding electrical signals representing video information of a television image.

6. A display device as claimed in claim 5 wherein a dielectric separating element is arranged in said gastight enclosure for limiting said zones of ionization in order to form elementary display cells forming a matrix whose lines and columns are said scanning lines and said parallel bands.

7. A display device as claimed in claim 6 wherein said radiating beam is received by said display panel on the main face on which is formed said polychromatic image.

8. A display device as claimed in claim 7 wherein said radiating beam has a wave length in the ultra-violet range.

* * * * *